United States Patent [19]
Rao et al.

[11] Patent Number: 6,088,421
[45] Date of Patent: Jul. 11, 2000

[54] METHOD AND APPARATUS FOR PROVIDING SCALED RATIO COUNTERS TO OBTAIN AGENT PROFILES

[75] Inventors: Ravi S. Rao, Phoenix; Elliot D. Garbus, Scottsdale, both of Ariz.

[73] Assignee: Intel Corporation, Santa Clara, Calif.

[21] Appl. No.: 09/123,855

[22] Filed: Jul. 28, 1998

[51] Int. Cl.$^7$ .................................................. H03K 21/00
[52] U.S. Cl. .............................................. 377/44; 377/16
[58] Field of Search ............................. 377/2, 118, 44, 377/16

[56] References Cited

U.S. PATENT DOCUMENTS

| | | | |
|---|---|---|---|
| 4,304,989 | 12/1981 | Vos et al. | 377/44 |
| 5,487,096 | 1/1996 | Pearson et al. | 377/44 |
| 5,771,267 | 6/1998 | Graef et al. | 377/16 |
| 5,790,625 | 8/1998 | Arimilli | 377/16 |

*Primary Examiner*—Margaret R. Wambach
*Attorney, Agent, or Firm*—Blakely, Sokoloff, Taylor & Zafman LLP

[57] ABSTRACT

A method and apparatus for monitoring an event is disclosed. In one embodiment, a ratio counter is provided which includes a first counter having a first count and a second counter having a second count. The method increments the first count of the first counter on an occurrence of an event by a first device and shifts the ratio counter to the right by a predetermined number of bits when the first count reaches a maximum count. The method further takes a ratio between the first count and the second count where the ratio indicates the relative occurrence of the event by the first device and a second device. In another embodiment, the method decrements the second count of the second counter when the first count reaches a maximum count. In yet another embodiment, the method decrements the first count of the first counter and the second count of the second counter when the first count reaches a maximum count.

20 Claims, 5 Drawing Sheets

| Buses | Exemplary Monitored Event |
|---|---|
| Secondary bus | Number of grants to the Bridge |
| | Number of grants to Secondary Address Translation Unit |
| | Number of grants to DMA |
| | Number of grants to the I/O processor |
| | Number of grants to external devices (agents) |
| Primary bus | Number of grants to the Bridge |
| | Number of grants to Primary Address Translation Unit P_ATU) |
| | Number of grants to the I/O processor |
| | Number of grants to DMA |
| Internal bus | Number of grants to subsystem processor |
| | Number of grants to DMA |
| | Number of times backoff (BOFF) asserted by Primary Address Translation Unit (P_ATU) |
| | Number of times backoff (BOFF) asserted by Secondary Address Translation Unit (S_ATU) |
| | Number of grants to P_ATU and S_ATU |
| Primary and Secondary buses | Number of clocks the bus is busy |
| | Number of clocks the bus is idle. |
| | Acquisition latency and ownership time for the P_ATU and S_ATU |
| | Acquisition latency and ownership time for DMA |
| | Acquisition latency and ownership time for the Bridge |
| | Acquisition latency and ownership time for external devices and the I/O processor |
| Internal bus | Acquisition latency and ownership time for the subsystem processor |
| | Acquisition latency and ownership time for DMA |
| | Acquisition latency and ownership time for the P_ATU |
| | Acquisition latency and ownership time for the S_ATU |

FIGURE 3

|     | 180 | Counter B = 14 | | | | Counter A = 5 | | | |
|-----|-----|---|---|---|---|---|---|---|---|
| T1  | 0   | 1 | 1 | 1 | 0 | 0 | 1 | 0 | 1 |

|     |     | Counter B = 15 | | | | Counter A = 5 | | | |
|-----|-----|---|---|---|---|---|---|---|---|
| T2  | 1   | 1 | 1 | 1 | 1 | 0 | 1 | 0 | 1 |

|     |     | Counter B = 15 | | | | Counter A = 4 | | | |
|-----|-----|---|---|---|---|---|---|---|---|
| T3  | 1   | 1 | 1 | 1 | 1 | 0 | 1 | 0 | 0 |

|     |     | Counter B = 14 | | | | Counter A = 4 | | | |
|-----|-----|---|---|---|---|---|---|---|---|
| T3' | 1   | 1 | 1 | 1 | 0 | 0 | 1 | 0 | 0 |

FIGURE 4B

METHOD AND APPARATUS FOR PROVIDING SCALED RATIO COUNTERS TO OBTAIN AGENT PROFILES

BACKGROUND OF THE INVENTION

1. Field of the Invention

The present invention relates generally to the field of monitoring events in a system, and specifically, to a method and apparatus for providing scaled counters to monitor events on a bus.

2. Background Information

Monitoring a manufactured digital integrated circuit ("IC") in real-time, i.e., while the IC is operating as part of the intended application, helps verify the functions of the IC and the IC's performance as well as that of its surrounding system. This may be done with the help of logic analyzers and in-circuit emulators. The conventional logic analyzer monitors the system in real-time by sensing the external signal lines of ICs within the system. In-circuit emulators physically replace the IC and emulate its functions while simultaneously recording external signal behavior in real-time. These conventional tools are currently used by board designers, software architects, and operating system vendors to optimize the performance of the system for a particular application. However, as the number of events which are monitored goes up, the amount of hardware required to monitor such events also increases.

Accordingly, it is desirable to provide a method and apparatus for monitoring events using less hardware.

SUMMARY OF THE INVENTION

In one embodiment, the present invention is a method that provides a ratio counter. The ratio counter includes a first counter having a first count and a second counter having a second count. The method increments the first count of the first counter on an occurrence of an event by a first device and shifts the ratio counter to the right by a predetermined number of bits when the first count reaches a maximum count.

BRIEF DESCRIPTION OF THE DRAWINGS

FIG. 3 illustrates an exemplary list of events that are monitored by the PMU.

FIG. 4B illustrates a saturation ratio counter, in accordance to another embodiment of the present invention.

DETAILED DESCRIPTION

The present invention is a ratio counter having one or more counters for monitoring various types of events including, for example, occurrence and duration events by one or more devices in a system. The ratio counter is configured as one or more counters for monitoring an event for an equal number of devices. Each time the event occurs for a device, the corresponding counter is incremented.

In one implementation, the ratio counter is an overflow ratio counter where if a counter reaches a maximum count, the ratio counter is right shifted by at least one bit position. In another implementation, the ratio counter is a saturation ratio counter where, in one embodiment, if a counter reaches a maximum count, each of the other counters that did not reach the maximum count are decremented, and, in another embodiment, if a counter reaches a maximum count, each of the one or more counters are decremented. Thereafter, an interrupt may be generated to write the ratio counter values into memory for evaluation.

Figure 1:
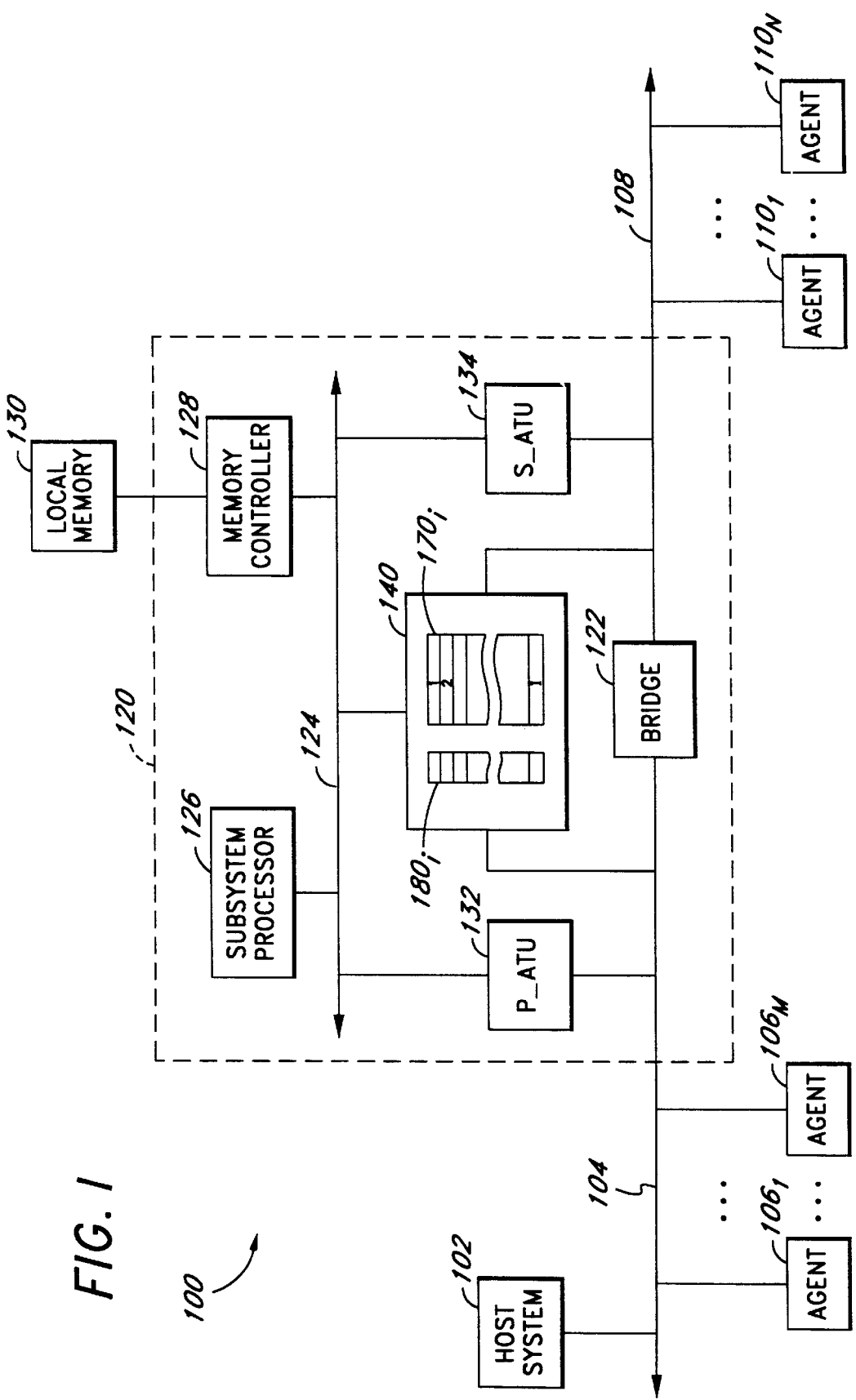
FIG. 1 illustrates an exemplary embodiment of a computer system in accordance with the teachings of the present invention.

FIG. 1 illustrates an exemplary embodiment of a computer system 100 in accordance with the teachings of the present invention. Referring to FIG. 1, the computer system 100 includes a data processor 120 which, in one embodiment, may be an input/output ("I/O") processor. Moreover, in one embodiment, the I/O processor is used to implement an intelligent I/O subsystem for improved I/O performance in computer systems such as servers and redundant array of inexpensive disks ("RAID") storage. The data processor 120 is coupled between a primary bus 104 and a secondary bus 108. The primary and secondary buses 104 and 108 may support different bus architectures. In one embodiment, the primary bus 104 and the secondary bus 108 are, for example, a peripheral component interconnect ("PCI") bus, an Extended Industry Standard Architecture ("EISA") bus, or any other type of bus architecture. In another embodiment, the primary and/or secondary buses 104 and 108 may be part of a ring-to-ring connection.

A host system 102 including a host processor, main memory, etc. (not shown) is coupled to the primary bus 104. One or more agents $106_1$–$106_M$ (where "M" is a positive whole number), including, but not limited or restricted to, a network adapter card, an image capture card, fax/modem card, I/O card, audio card, and the like may be optionally coupled to the primary bus 104. Similarly, one or more agents $110_1$–$110_N$ (where "N" is a positive whole number), including, but not limited or restricted to, one or more exemplary agents listed above may be optionally coupled to the secondary bus 108.

The data processor 104 includes a bus bridge 122 which, in general, connects two independent buses together. In the embodiment shown, the bridge 122 bridges (interfaces) transactions between agents on the primary and secondary buses 104 and 108. An internal bus 124 that does not extend outside the data processor 120 is used for communication between a subsystem processor 126 and a local memory 130 via a memory controller 128. Local memory 130 normally stores instructions to be executed by the subsystem processor 126. Communication between the primary and secondary buses 104 and 108 and the internal bus 124 is accomplished via primary and secondary address translation units ("P_ATU") 132 and ("S_ATU") 134, which act as bridge-like devices.

The data processor 120 further includes a performance monitoring unit ("PMU") 140 which is coupled to the primary bus 104, the secondary bus 108, and the internal bus 124. The PMU 140 includes a plurality of event counters (hereinafter also referred to as "ratio counters") $170_1$–$170_I$ ($170_i$) which may be implemented in registers and a corresponding plurality of status bits $180_1$–$180_I$ ($180_i$) which may be implemented as part of the registers. The buses coupled to the PMU 140 represent signal paths that carry event information from the buses and their respective bus interfaces (not shown) to the PMU 140. The PMU 140 uses the event counters $170_i$ to monitor performance of one or more devices and/or agents on the buses by keeping track of, for example, occurrence events and duration events. An event includes a set of parameters which define a start condition and a stop condition. In one embodiment, event information includes occurrences and duration of such occurrences on the buses which are caused by communication between devices on the internal bus 124 (e.g., subsystem processor 126 or memory controller 128), devices on the primary bus 104 (e.g., the host system 102), and devices on the secondary bus 108 (e.g., agents 110).

An occurrence event is counted each time the event occurs and includes for example, the number of grants to an agent on a bus. For a duration event, a counter counts the number of clocks during which a particular condition or set of conditions is true. By way of example, a duration event may be an arbitration latency which represents the elapsed time between a bus mater's request to use a bus until the requesting master is granted the bus, or a bus acquisition latency which represents the elapsed time between the requesting bus master being granted the bus and the current bus master surrendering the bus allowing the requesting master to initiate the next transaction. The occurrence and duration information may then be used to determine, for example, the relative bus activity of one or more devices and/or agents. Based on this information, system performance may be optimized. In essence, the PMU 140 emulates the functionality of a logic analyzer at the chip level.

The event counters $170_i$ may be read by software being executed in the system 100. In one embodiment, the software may include instructions stored in the local memory 130 for execution by the processor 126. The event counters $170_i$ may be a series of memory-mapped registers that are accessed by the processor 126 via the internal bus 124. Other configurations for accessing the registers $170_i$, however, are possible. For instance, the registers may be accessed via the primary bus 104 in response to instructions stored and executed by the host system 102. The software executed in the system 100 may periodically read the count values in the event counters $170_i$ and place the results in memory, such as the local memory 130 or main memory in the host system 102. A test or diagnostic software can then be used to read the count values placed in memory to evaluate the relative number of times an agent or a device performs an operation and the relative amount of time spent in performing such operation. Based on this information, the system can then be fine tuned for optimum system performance.

Each event counter 170 may modify, e.g., increment, decrement, shift left or right, etc., its count value in response to a count signal. The count signal may be related to one or more control signals asserted by one or more agents and/or devices on the buses. The count signals may be obtained by performing various logic and timing operations on signals from various state machines that govern the agents and devices. The count signals represent a variety of different occurrences and duration to be monitored.

Figure 2:
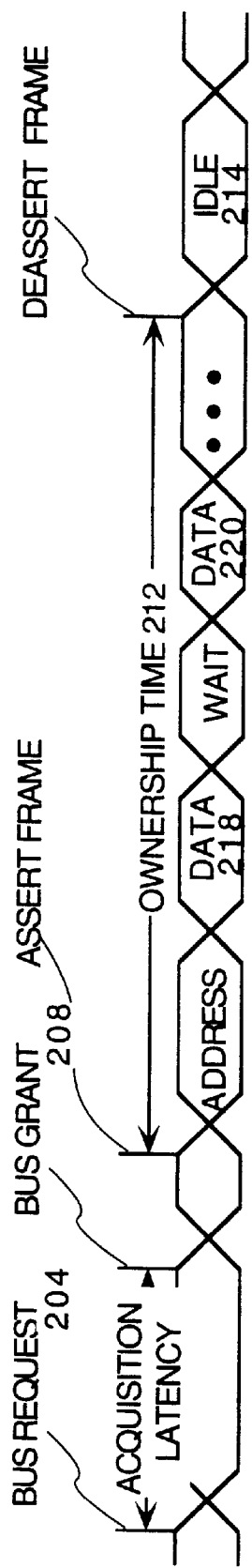
FIG. 2 illustrates an exemplary timing diagram of a bus showing occurrences such as a bus request and a bus grant.

FIG. 2 illustrates an exemplary timing diagram of a bus showing occurrences such as a bus request 204 and a bus grant 208. Other occurrences include a retry signal asserted by the P_ATU 130 in response to a transaction request received over the primary bus 104 (see FIG. 1), and grant of bus ownership asserted by a bus arbiter in response to a request by a master. Additionally, an event counter may be configured to count the duration in which one or more conditions are true. The duration may be, for example, the number of bus clock cycles during which a bus is busy, such as ownership time 212 in FIG. 2. A variety of different durations to be monitored are contemplated, including, for example, the times of bus idle 214 and data phases 218 and 220.

FIG. 3 illustrates an exemplary list of events that are monitored by the PMU 140. The events relate to primary and secondary buses 104 and 108 as part of an intelligent I/O subsystem. The monitored events include the number of grants to direct memory access ("DMA") channels that are not shown in FIG. 1 but would appear as devices coupled between the internal bus 124 and the primary and secondary buses 104 and 108. The operation of the DMA channels are well-known by those skilled in the art and are not discussed in any detail here. In general, the monitored events may include the number of grants to any device on any one of the buses that are coupled to the data processor 104.

Referring back to FIG. 1, each ratio event counter 170 is X-bits wide which may be broken up into Y counters, each being Z-bits wide (where "X", "Y", and "Z" are positive whole numbers). For example, each ratio counter is thirty-two bits wide, broken up into two, sixteen-bit wide counters. Each counter monitors a similar event, but for a different device or agent. The result can then be correlated by taking the ratio between the two counters. For example, each counter in the ratio counter may be used to track the number of grants received by two agents (e.g., agents $110_1$ and $110_2$) on the secondary bus 108. This information is used to obtain performance metrics such as relative bus ownership by the two agents. By using a single ratio counter, a single event for two or more separate devices or agents may be monitored and evaluated using less hardware. The ratio counters may be implemented in a number of embodiments including, but not limited or restricted to, overflow counters and saturation counters. In one embodiment, once one of the counters in the ratio counter 170 reaches a maximum value (e.g., all bit positions are a one), the PMU 140 sets the ratio counter's corresponding status bit 180 and generates an interrupt to the subsystem processor 126 or the host processor (not shown) in the host system 102 which places the count values in the ratio counter in local memory 130 or main memory (not shown).

Figure 4A:
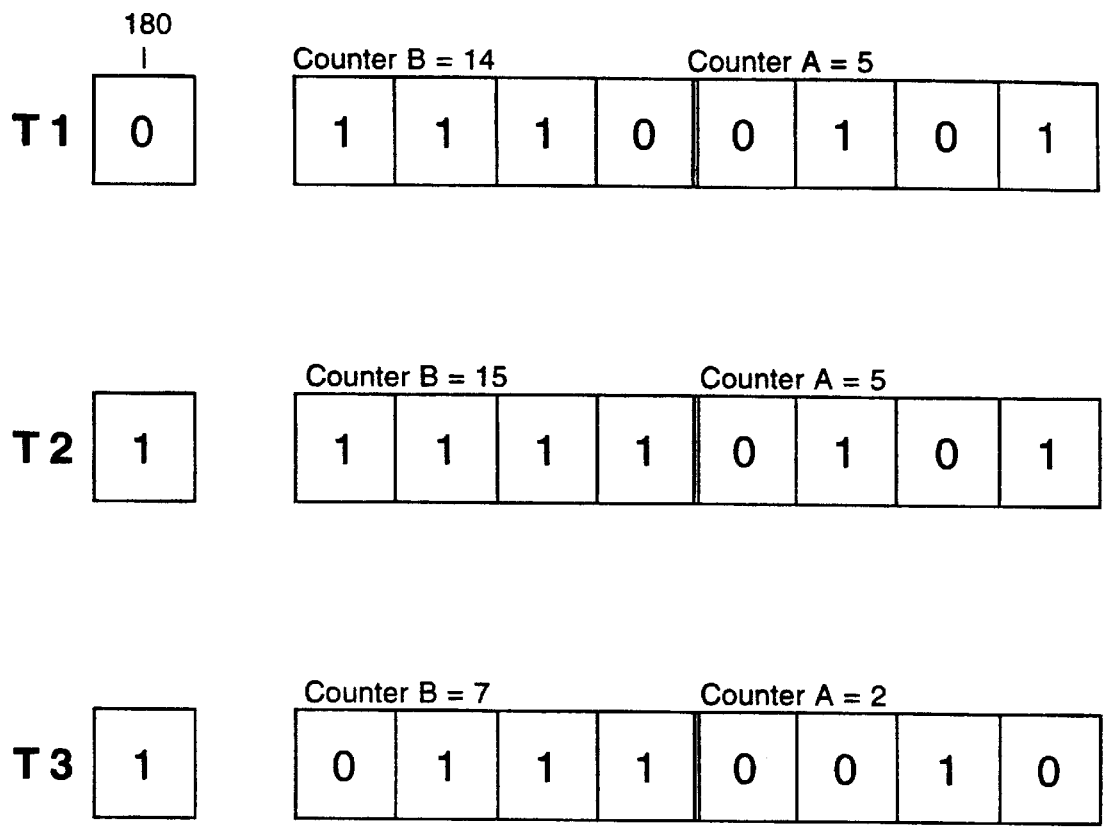
FIG. 4A illustrates an overflow ratio counter, in accordance to one embodiment of the present invention.

FIG. 4A illustrates an overflow ratio counter, in accordance to one embodiment of the present invention. For sake of illustration of the present invention, the overflow ratio counter 170 is divided into two, four-bit counters, namely counter A and counter B, where counters A and B track the number of bus grants received by two devices (e.g., agents A and B, respectively) on a bus (e.g., the primary bus 104). In addition, the overflow ratio counter 170 includes a status bit 180 which specifies whether either of the counters has reached a maximum count. The maximum count may be set to any value, but is typically set to the maximum value of a counter.

For example, at an arbitrary time T1, counter A has a count of 5 and counter B has a count of 14. At time T2, counter B is incremented to count 15 in response to agent B receiving a bus grant. As a result, the status bit 180 is set to indicate that at least one of the counters is at its maximum value (in this case, counter B). At time T2, the actual ratio of the occurrence of the event between agents A and B is (5:15). Thus, the relative occurrence of the event (a bus grant) for agent A is 25% and for agent B is 75%. If B is incremented again, it will overflow and counter B will restart at count 0. This is undesirable because counter B will then contain incorrect information. To prevent this, the present invention shifts the ratio counter to the right by one bit position (i.e., performs a divide by two operation).

Thus, at an arbitrary time T3, if agent B receives another bus grant, the ratio counter 170 is right shifted by one bit position. In an alternative embodiment, status bit 180 is set at time T3 rather than at time T2. The approximated bus ownership ratio for counters A and B now becomes (2:7). That is, the approximated relative occurrence of the event for agent A is (2/9) or 22.2% and for agent B is (7/9) or 77.8%. The actual relative occurrence of the event for agent A is (5/21) or 23.8% and for agent B is (16/21) or 76.2%. As can be seen, the approximated ratio is very close to the actual ratio. By using the present invention, only half the hardware is needed to monitor a single event. In other words, with the present invention, the same amount of hardware now monitors twice the total number of events. Moreover, using the technique of the present invention allows for longer observation periods without a need to interrupt the process execution to capture the counter values. In a real design, the counters will typically have a minimum width of 16 bits, which drastically reduces the error percentage between the actual ratio and the approximated ratio.

FIG. 4B illustrates a saturation ratio counter, in accordance to another embodiment of the present invention. As with the overflow ratio counter of FIG. 4A, the saturation ratio counter 170 of FIG. 4B is divided into two, four-bit counters, namely counters A and B and monitor the same event. In this implementation, if a counter reaches a maximum value, the counter that did not reach its maximum value is decremented, or, in a second embodiment, both counters are decremented.

For example, at time T1, counter A has a count of 5 and counter B has a count of 14. At an arbitrary time T2, if counter B is incremented by one to 15 in response to the occurrence of the event with respect to count B, the status bit 180 is set to indicate that at least one of the counters is at its maximum value (in this case counter B). In a first embodiment, if at time T3, agent B receives another grant, counter A is decremented by one. The approximated bus ownership ratio for counters A and B now becomes (4:15). That is, the approximated relative occurrence of the event for agent A is (4/19) or 21.0% and for agent B is (15/19) or 79%. The actual relative occurrence of the event for agent A is (5/21) or 23.8% and for agent B is (16/21) or 76.2%.

In a second embodiment, if at time T3', agent B receives a grant, both counter A and counter B are decremented by one. The approximated bus ownership ratio for counters A and B now becomes (4:14). That is, the approximated relative occurrence of the event for agent A is (4/18) or 22.2% and for agent B is (14/18) or 77.8%. The actual relative occurrence of the event for agent A is (5/21) or 23.8% and for agent B is (16/21) or 76.2%. As can be seen, the approximated ratio is very close to the actual ratio in both embodiments.

In the illustrative examples of FIGS. 4A and 4B, the counters were each four-bits wide. In a real design, the counters will typically have a minimum width of 16 bits, if not 24 bits. Therefore, the error percentage between the actual ratio and the corrected ratio will be negligible. The advantage of the present invention is that the total sampling time before an overflow occurs is longer allowing for intermediate storage of counter values while servicing an interrupt due to an unrelated context switch. Hence, the scaling error of the ratio counter may never materialize.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method, comprising:
    providing a ratio counter including a first counter having a first count and a second counter having a second count;
    incrementing the first count of the first counter on an occurrence of an event by a first device; and
    shifting the ratio counter to the right by a predetermined number of bits when the first count reaches a maximum count.

2. The method of claim 1 further comprising taking a ratio between the first count and the second count, the ratio indicating the relative occurrence of the event by the first device and by a second device, respectively.

3. The method of claim 1 wherein prior to shifting the ratio counter, the method comprises incrementing the second count of the second counter on the occurrence of the event by a second device.

4. The method of claim 1 wherein the event is a grant of a bus request.

5. The method of claim 1 wherein the first counter and the second counter have an equal number of bits with the first counter occupying the most significant bits of the ratio counter.

6. The method of claim 1 wherein the first counter and the second counter have an unequal number of bits with the first counter occupying the most significant bits of the ratio counter.

7. The method of claim 1 wherein the maximum count occurs when all bit positions in the first counter are set.

8. The method of claim 1 further comprising writing the count values in the first and second counters into memory.

9. The method of claim 2 wherein the first and second devices are each agents.

10. A method, comprising:
    providing a ratio counter including a first counter having a first count and a second counter having a second count;
    incrementing the first count of the first counter on an occurrence of an event by a first device; and
    decrementing the second count of the second counter when the first count reaches a maximum count.

11. The method of claim 10 further comprising taking a ratio between the first count and the second count, the ratio indicating the relative occurrence of the event by the first device and by a second device, respectively.

12. The method of claim 10 wherein decrementing the second count comprises decrementing the first count of the first counter and the second count of the second counter when the first count reaches a maximum count.

13. The method of claim 10 wherein the event is a grant of a bus request.

14. The method of claim 10 wherein the first counter and the second counter have an equal number of bits with the first counter occupying the most significant bits of the ratio counter.

15. The method of claim 10 wherein the first counter and the second counter have an unequal number of bits with the first counter occupying the most significant bits of the ratio counter.

16. The method of claim 10 wherein the maximum count occurs when all bit positions in the first counter.

17. The method of claim 10 further comprising writing the count values in the first counter and the second counter to memory.

18. An apparatus for monitoring a first device and a second device, comprising: a counter divided up into at least a first sub-counter having a first count and a second sub-counter having a second count, the first count of the first sub-counter to be incremented on an occurrence of an event by the first device, the second count of the second sub-counter to be incremented on the occurrence of the event by the second device, the counter to be shifted to the right by a predetermined number of bits when either the first count or the second count reaches a maximum count.

19. The apparatus of claim 18 further comprising taking a ratio between the first count and the second count, the ratio indicating the relative occurrence of the event by the first device and by the second device, respectively, over time.

20. An apparatus for monitoring a first device and a second device, comprising: a counter divided up into at least a first sub-counter having a first count and a second sub-counter having a second count, the first count of the first counter to be incremented on an occurrence of an event by the device, the second counter to be decremented when the first count of the first counter reaches a maximum count.

* * * * *